United States Patent [19]

Perego

[11] Patent Number: 5,203,801
[45] Date of Patent: Apr. 20, 1993

[54] APPARATUS FOR SUPPLYING TAPE LOADING MACHINES WITH REELS OF TAPE

[75] Inventor: Luciano Perego, Mezzago, Italy
[73] Assignee: Tapematic U.S.A., Inc., Orlando, Fla.
[21] Appl. No.: 585,710
[22] Filed: Sep. 20, 1990

[30] Foreign Application Priority Data

Aug. 6, 1990 [IT] Italy .................. 21223A/90

[51] Int. Cl.⁵ ................ B65H 19/30; B65H 75/24
[52] U.S. Cl. ................ 242/58.6; 242/56 R; 242/72 R
[58] Field of Search .......... 242/58.6, 58, 56 R, 242/72 R, 72.1, 68.1, 68.2, 68.3, 56.9, 79; 269/48.1; 279/2 R

[56] References Cited

U.S. PATENT DOCUMENTS

| | | | |
|---|---|---|---|
| 3,224,701 | 12/1965 | Wynne | 242/68.1 |
| 3,275,255 | 9/1966 | Pitts | 242/68.3 |
| 3,695,539 | 10/1972 | Lindstaedt | 242/72 R |
| 3,877,653 | 4/1975 | Foltyn et al. | 242/79 X |
| 4,073,497 | 2/1978 | Flagg et al. | 242/72.1 X |
| 4,139,165 | 2/1979 | Dyck | 242/56.9 |
| 4,432,506 | 2/1984 | Bingaman | 242/68.3 |
| 4,441,662 | 4/1984 | Seragnoli | 242/58.6 X |
| 4,589,811 | 5/1986 | Riccardo et al. | 242/58.6 X |
| 4,597,316 | 7/1986 | Ichikawa | 242/58 X |
| 4,690,346 | 9/1987 | Takeda et al. | 242/56 R |
| 4,732,342 | 3/1988 | Möbius | 242/68.3 X |
| 4,744,711 | 5/1988 | Heitmann et al. | 242/58 X |
| 4,798,349 | 1/1989 | Manservisi | 242/58.6 X |
| 4,821,972 | 4/1989 | Grollimund et al. | 242/72.1 X |
| 4,958,839 | 9/1990 | Guzik et al. | 242/68.3 X |
| 5,031,381 | 7/1991 | Focke | 242/58.6 X |

FOREIGN PATENT DOCUMENTS

| | | | |
|---|---|---|---|
| 1140792 | 12/1962 | Fed. Rep. of Germany | 242/68.3 |
| 1209840 | 1/1966 | Fed. Rep. of Germany | 242/68.3 |
| 2309446 | 11/1976 | France | 242/58.6 |

Primary Examiner—Daniel P. Stodola
Assistant Examiner—John P. Darling
Attorney, Agent, or Firm—Edgar H. Haug; Adam L. Brookman

[57] ABSTRACT

In a cassette loading machine several loading modules carry out the loading of a predetermined amount of use tape into the individual cassettes, said tape being continuously supplied from a pancake mounted on a support hub. When one of the pancakes mounted on one of the hubs is out of tape, the intervention of a manipulating unit occurs and said unit picks up, by means of a grasping and release member carried by a supply module, a new pancake filled with use tape from a storage unit located sideways. The manipulating unit moves close to the out of tape pancake and removes it from the respective support hub with the aid of a grasping member carried by a discharge module. Them the new pancake filled with use tape is mounted onto the support hub in place of the out of tape pancake.

15 Claims, 8 Drawing Sheets

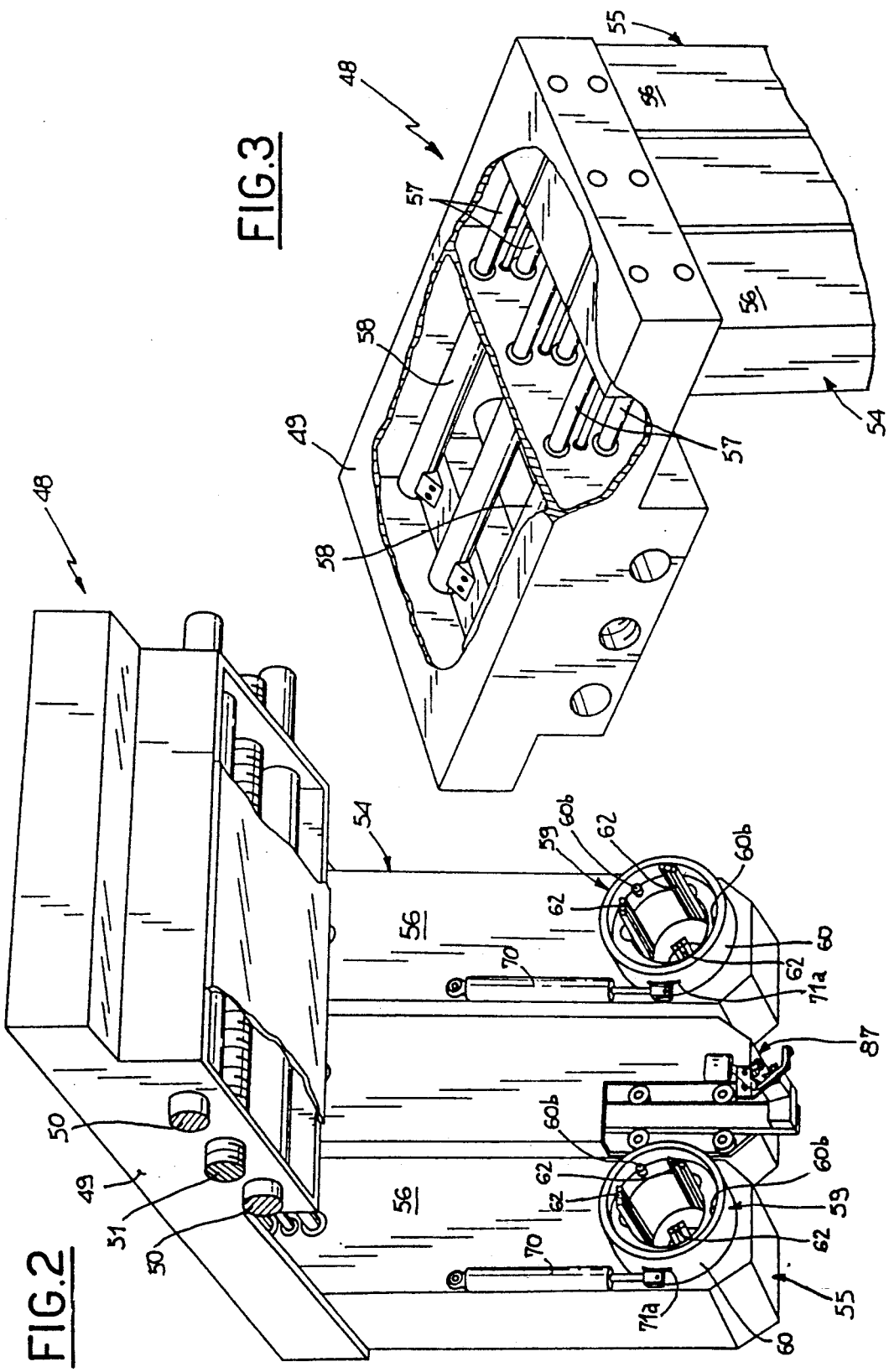

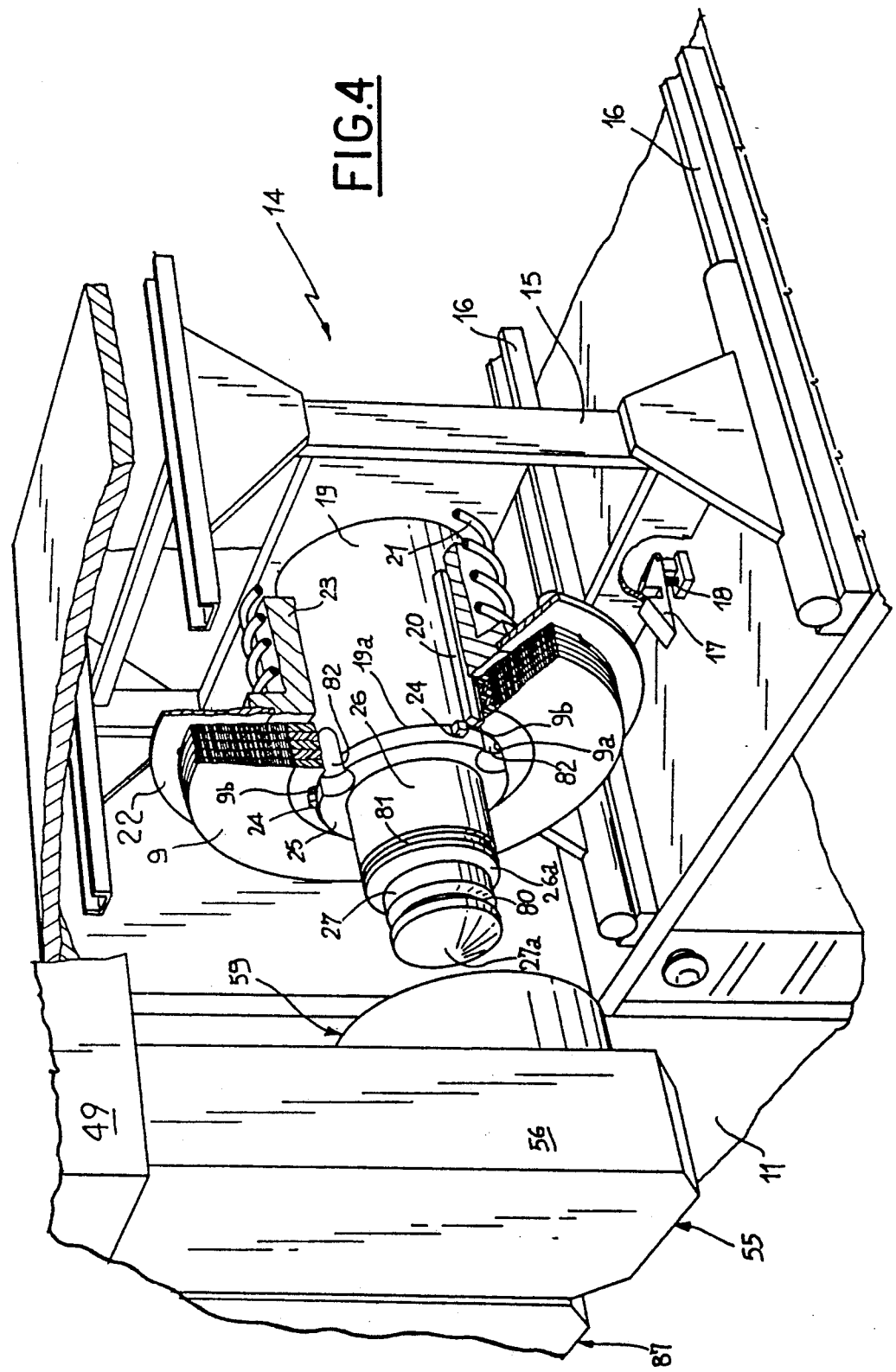

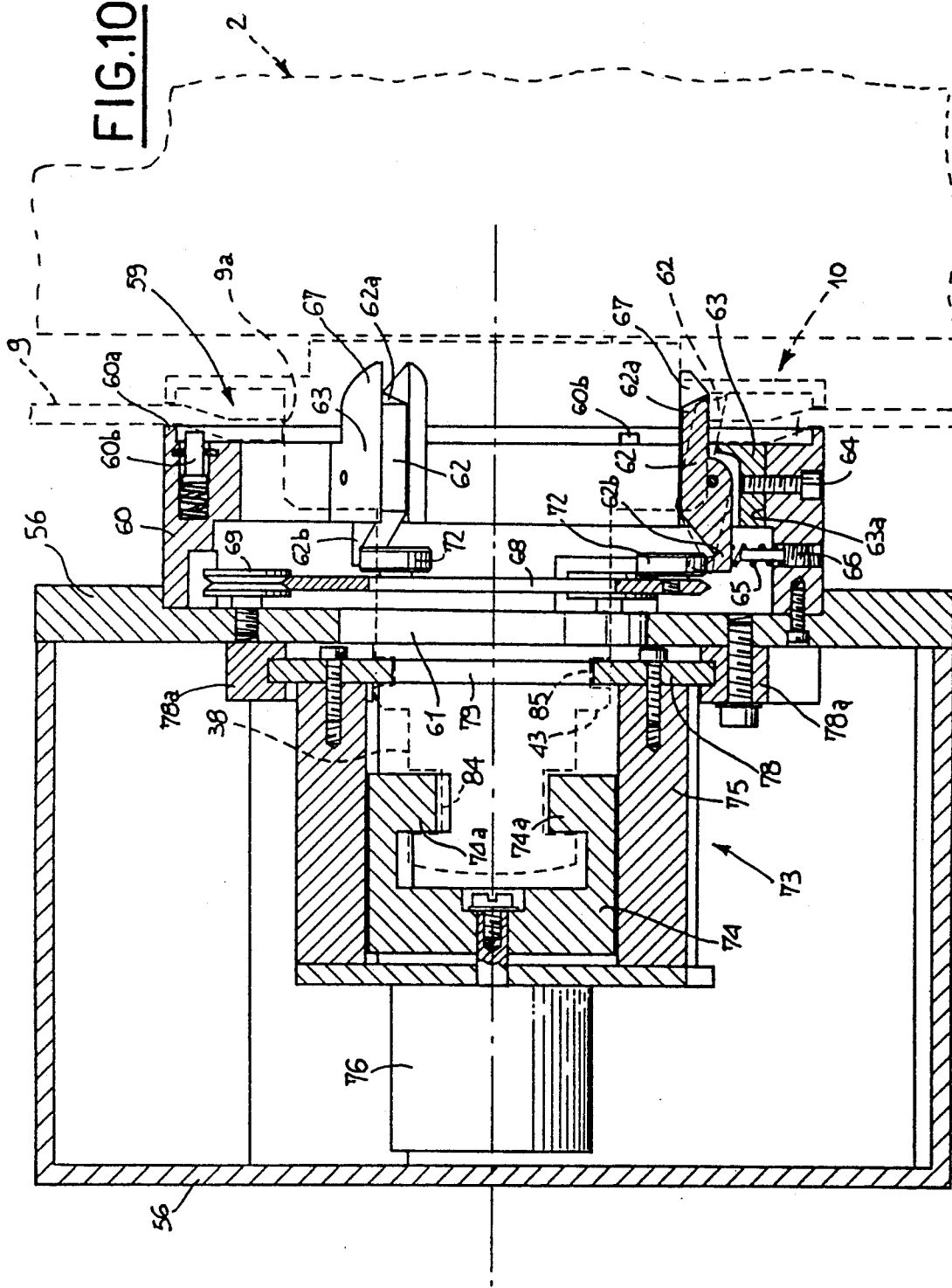

APPARATUS FOR SUPPLYING TAPE LOADING MACHINES WITH REELS OF TAPE

BACKGROUND OF THE INVENTION

The present invention relates to a method and an automatic apparatus for supplying cassette loading machines with magnetic tape reels, of the type comprising at least a support hub mounted on a front wall of a cassette loading machine, designed to operatively engage a magnetic tape reel at a coupling opening exhibited by the reel itself and operable in rotation according to a horizontal axis in order to cause the unwinding of the magnetic tape from the reel.

The described apparatus has been particularly studied so as to be associated with a loading machine provided with several loading modules operating independently of one another and adapted for loading individual cassettes with magnetic tapes coming from respective reels each associated with one of the modules. However the apparatus in question can also be used in less advanced loading machines e.g. provided with a single loading station.

PRIOR ART

It is known that there are automatic machines adapted to carry out the loading of the magnetic tape into cassettes by engaging each cassette individually in a loading station where a predetermined amount of magnetic tape is wound into the cassette. The magnetic tape is continuously fed from a removable reel fitted on a support hub mounted to a front wall of the loading machine and operable in rotation, according to a horizontal axis, in timed relationship with one or more motors causing the winding of the tape into the cassette.

Said machines perform their functions in a satisfactory manner but they have some drawbacks originating from the fact that, at the present state of the art, each time the reel carried by the hub becomes out of tape the manual intervention of an operator is needed in order to execute the replacement of the empty reel with a new loaded (full) reel. Although this operation seems to be of easy accomplishment the replacement of the reels on the support hub is always time-consuming for the operator.

Under this situation, many difficulties are encountered in order to comply with the requirement of entrusting a single operator with the control and management of several loading machines.

In the light of the foregoing discussion it appears clear that it would be convenient to provide said loading machines with apparatus capable of carrying out the replacement of the out of tape reels with new filled reels in an automatic manner.

It is also pointed out that the same Applicant has recently developed a loading machine provided with a number of loading modules each provided with a respective loading station in which the loading of cassettes with magnetic tape coming from a respective reel is carried out. Such a machine has been the object of the Patent Applications filed on the same date in the name of the same Applicant including U.S. application Ser. No. 07/585,395 now U.S. Pat. No. 5,125,587 entitled Tape Loading Center which is incorporated herein by reference.

Therefore it will be recognized that the high productivity of this new cassette loading machine provided with several loading modules would run the risk of being impaired if the replacement of the reels on the support hubs should be carried out completely by hand.

SUMMARY OF THE INVENTION

Consequently, the object of the present invention is substantially to solve the above problem, by providing a method and an apparatus adapted to carry out the removal of the out of tape reels from the respective support hubs in a completely automatic manner, as well as their replacement with new loaded (full) reels.

Another object of the invention is to provide a method and apparatus adapted for being associated either with cassette loading machines provided with a single loading station or with cassette loading machines provided with several loading modules disposed in side by side relation with respect to one another.

The foregoing and further objects that will become more apparent in the course of the present invention are substantially attained by an automated apparatus for supplying cassette loading machines with reels filled with magnetic tape, commonly referred to as "pancakes", the apparatus comprising: a storage unit located sideways to the support hub and designed to store a plurality of pancakes consecutively aligned according to an axis parallel to the axis of the hub itself, a main carriage slidably guided on said loading machine in a direction at right angles to the axis of the support hub; at least a support arm extending from the main carriage and movable parallelly to the axis of the support hub from a rest positioning which it is spaced apart from the front wall of the loading machine to a working position in which it is located close to said front wall; at least a grasping and release member connected to the support arm and susceptible of being operatively engaged, as a result of the movements of the main carriage and the support arm, with the support hub and the storage unit respectively in order to remove an out of tape pancake from the hub, pick up a new filled pancake from the storage unit and fit said new pancake on said hub in place of the out of tape one.

BRIEF DESCRIPTION OF THE DRAWINGS

In the drawings:

FIG. 2 is a perspective view of the manipulating unit being part of the apparatus in reference, particularly showing the grasping and release members facing the front wall of the cassette loading machine;

FIG. 3 is a fragmentary perspective view of a detail of the manipulating unit shown in FIG. 2, seen from the opposite side;

FIG. 4 is a fragmentary perspective view seen from the opposite side relative to FIG. 1, of a storage unite being part of the apparatus in reference;

FIG. 10 is a sectional view of the grasping member viewed in FIG. 9, taken along an oblique diametrical plane.

DESCRIPTION OF THE PREFERRED EMBODIMENT

Figure 1:
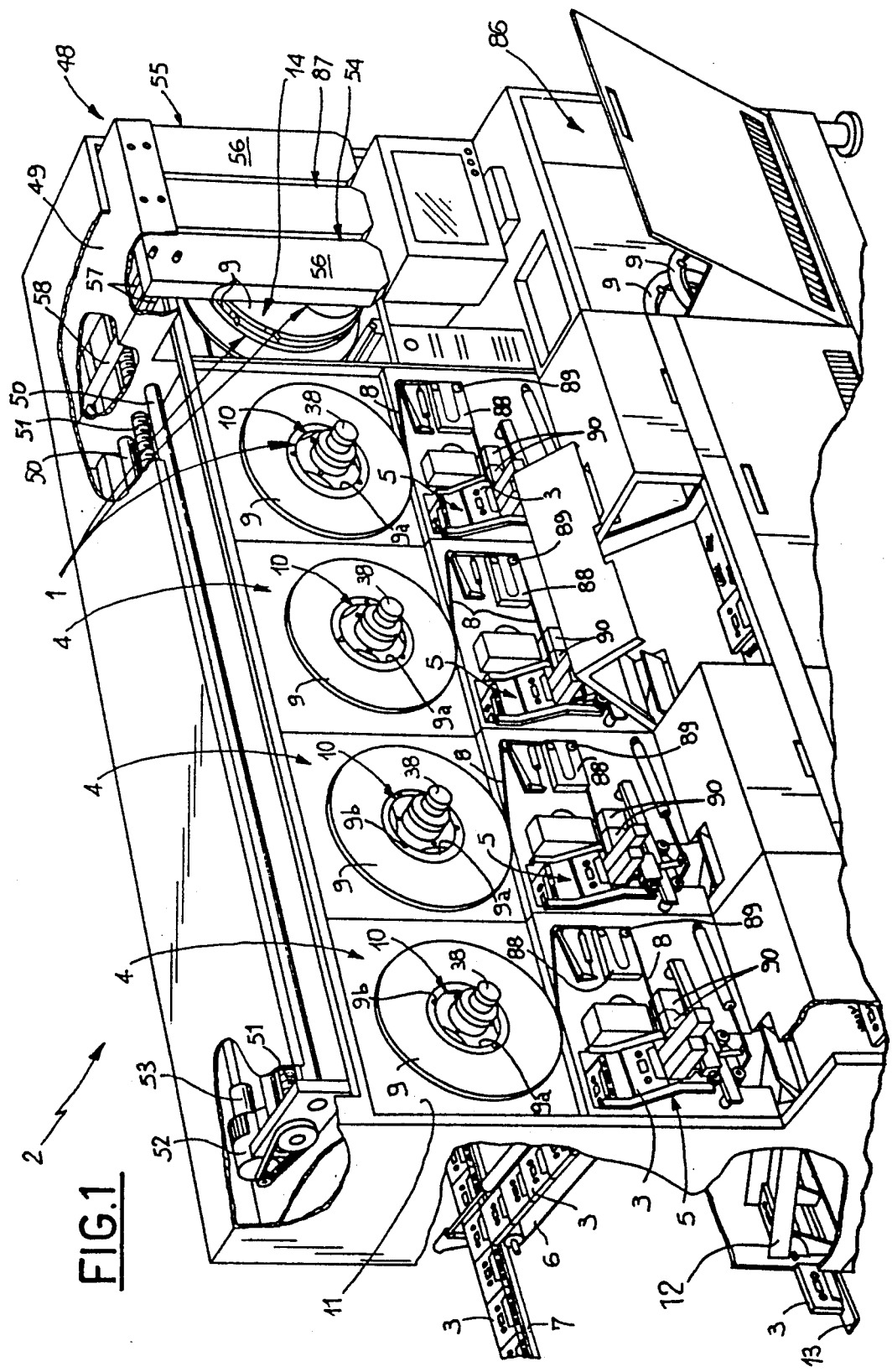
FIG. 1 is a perspective view of a cassette loading machine provided with the apparatus of the invention.

Referring particularly to FIG. 1, an automated apparatus for supplying cassette loading machines with magnetic tape reels or pancakes in accordance with the present invention has been generally identified by reference numeral 1.

The apparatus 1 is associated in the example shown with a cassette loading machine 2 Comprising a plurality of loading nodules 4 disposed in side by side relation with respect to one another. Each loading module 4 has a loading station 5 for the individual engagement of the cassettes 3 coming from an in-feed belt conveyer 6 terminating in a supply belt conveyor 7 supplying all loading modules 4 with the necessary cassettes 3.

Figure 6:
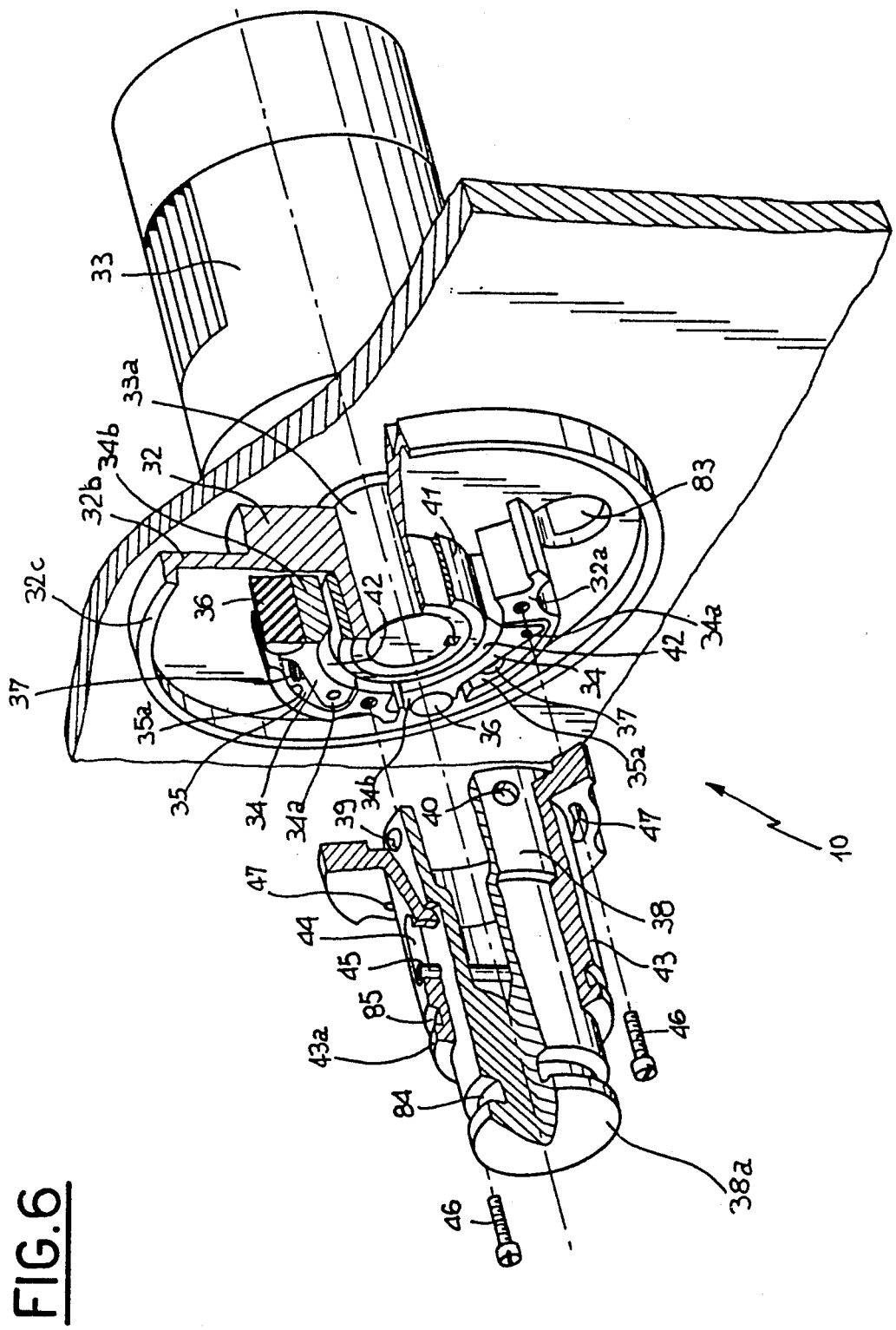
FIG. 6 is an exploded perspective view of the pancake support hub provided in the cassette loading machine of the invention.

The cassette 3 held in a loading station 5 is loaded with a predetermined amount of magnetic tape 8 continuously fed from a pancake 9 which is operatively engaged, through a coupling opening 9a present thereon, by a support hub 10 mounted on a front wall 11 of the loading machine 2 and operable in rotation according to a horizontal axis upon command of an electric motor 33 (FIG. 6).

When the designated amount of magnetic tape 8 has been loaded into a cassette 3, the cassette is released from the loading station 5 and drops down to a discharge chute 12 transferring it to a discharge belt conveyor 13.

Each time it is detected by sensors, that one of the pancakes 9 mounted on hubs 19 is out of tape 8, the apparatus 1 is operated and it automatically carries out the replacement of the out of tape pancake 9 with a new pancake filled with magnetic tape 8.

To this end the apparatus 1 involves the presence of a storage unit 14 disposed laterally in side by side relation and in horizontal alignment with the support hubs 10 and designed to hold a plurality of pancakes 9 filled with magnetic tape, commonly referred to as use tape, coaxially aligned according to an axis parallel to and in coplanar relation with the axes of the hubs themselves.

Figure 5:
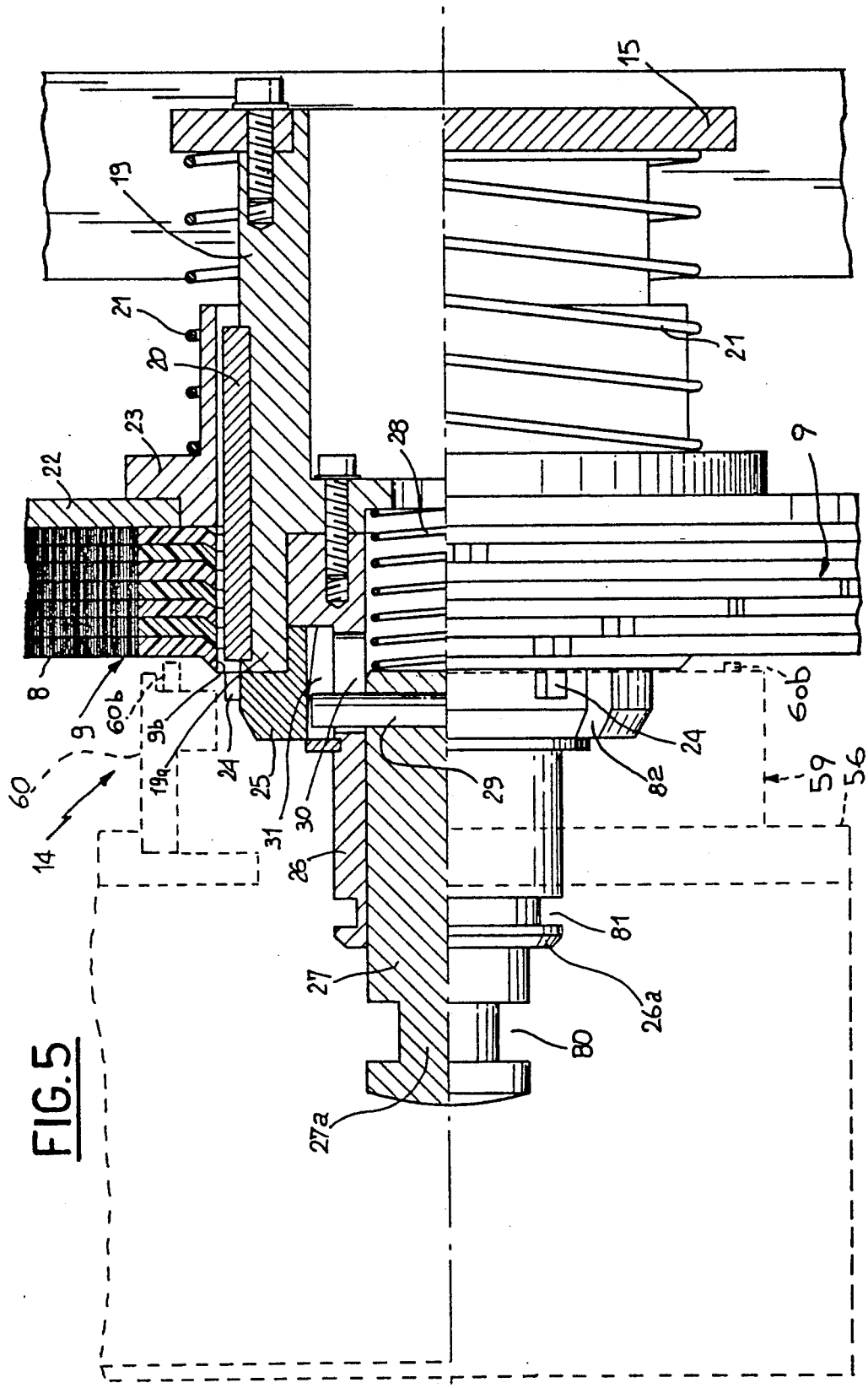
FIG. 5 is an interrupted diametrical sectional view of the storage unit.

The storage unit 14, referring particularly to FIGS. 4 and 5, substantially comprises a support framework 15, preferably mounted on slide rails 16 fixedly carried by the loading machine 2. The positioning of the framework 15 on the rails is secured in a removable manner by a hooking element 17 which is submitted to an elastic oscillation against the action of a return spring 18. The storage unit 14 can therefore be supplied with filled pancakes 9 separately from the loading machine, being subsequently engaged, by hand or using automated transport means, onto the rails 16 and pushed therealong until it is stopped and fastened to the hooking element 17.

The hooking element 17 can be operated either by hand or by a small fluid-operated actuator, so as to cause the disengagement of the storage unit 14 from the guide rails 16.

Fixedly mounted in cantilevered fashion on the support framework 15 is one guide sleeve 19 on which the pancakes 9 filled with use tape 8 are slidably engaged. Longitudinally extending on the first guide sleeve 19 is at least a guide element 20 slidably engaging into grip recesses 9b formed on the circumferential edge of the coupling opening 9a. In the example shown each pancake 9 has three grip-recesses 9b distributed at 120° from each other about the axis of the sleeve 19 and each engaged by a corresponding guide element 20.

The engagement of the guide elements 20 into the recesses 9b causes the pancakes 9 to be prevented from rotating, while they can however slide on the first sleeve 19. The pancakes 9 are constantly pushed toward the front end 19a of the first sleeve 19 by a preload spring 21 operating between the support framework 15 and a pusher dish 22 directly acting on the pancakes themselves.

In the embodiment shown an annular connecting element 23 is located intermediate the spring 21 and the pusher dish 22.

On the opposite side with respect to the pusher dish 22 there is at least a pawl 24 interacting in abutment with the pancakes 9 in order to hold them axially locked on the first sleeve 19 against the action of the preload spring 21. In the example shown three pawls 24 are provided and they are circumferentially distributed at 120° from each other about the axis of the first sleeve 19.

Pawls 24 are fixedly carried by a release collar 25 rotatably engaged onto a second guide sleeve 26 which is coaxially fastened to the front end 19a of the first sleeve 19 and exhibits an outer diameter smaller than the diameter of the first sleeve. The second guide sleeve 26 slidably engages, at the inside thereof, a drive shank 27 axially movable towards the first guide sleeve 19 against the action of a return spring 28. As seen from the figures, the drive shank 27 and the guide sleeve 26 are preferably provided, close to the respective free ends 27a, 26a, with circumferential grooves 80, 81 adapted to be engaged by drive means 73 to be described in the following so as to cause the axial movement of the drive shank 27.

Fastened to the drive shank 27 is a drive peg 29 radially projecting from the shank itself so that it slidable engages into at least a longitudinal slit 30 offered by the second guide sleeve 26. As clearly shown in FIG. 5, the drive peg 29 also projects from the longitudinal slit 30 and operatively engages into a helical groove 31 formed at the inside of the release collar 25. In this way, when the drive shank 27 is axially pushed towards the first sleeve 19, the axial sliding of the drive peg 29 causes an angular rotation of the release collar 25. As a result of the above angular rotation, the pawls 24 are brought into alignment with the respective grip recesses 9b in the pancakes 9, so that one of said pancakes 9 can slide on the pawls 24 and be released from the first guide sleeve 19 and consequently from the storage unit 14.

Figure 7:
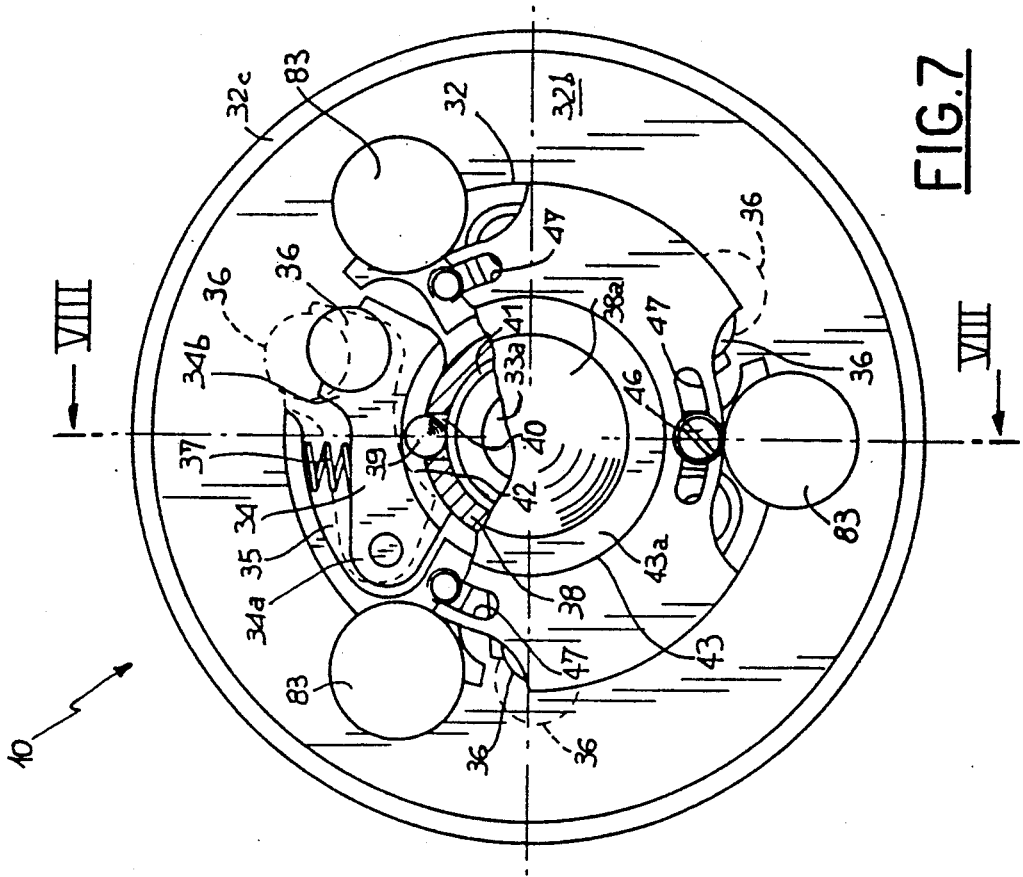
FIG. 7 is a front view of the hub shown in FIG. 6.
Figure 8:
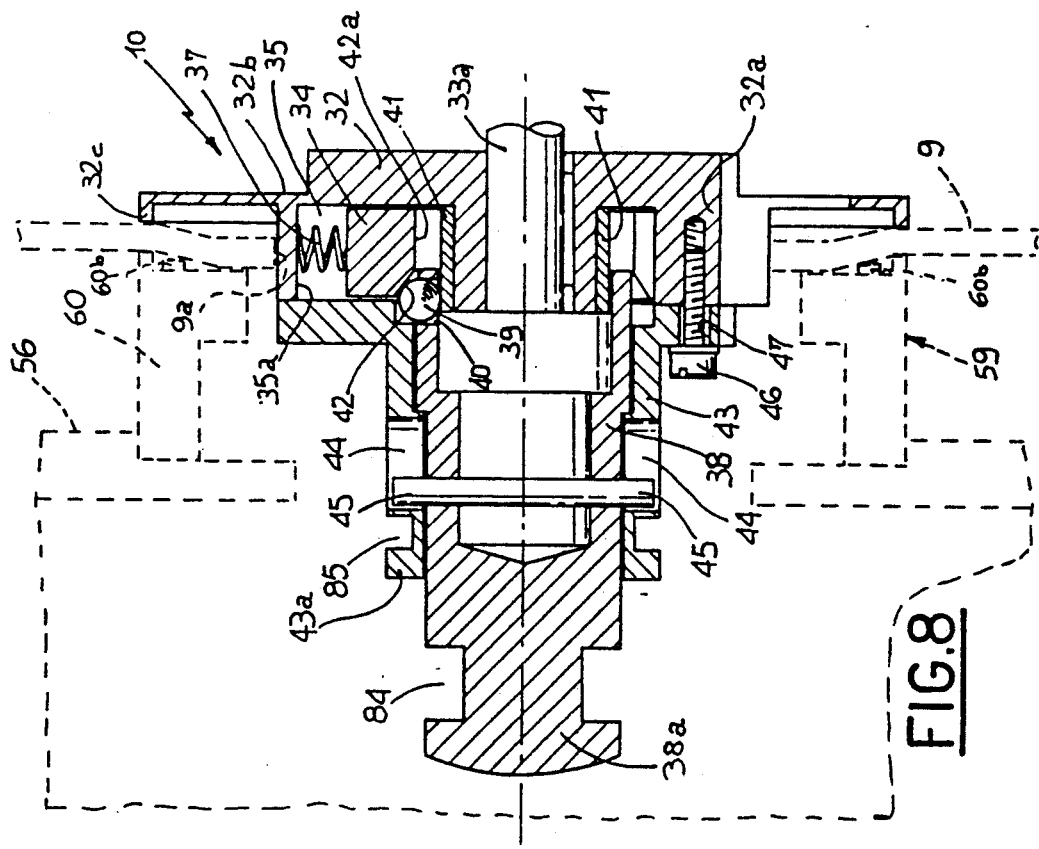
FIG. 8 is a sectional view of the hub taken along line VIII—VIII in FIG. 7.

Reference is now particularly made to FIGS. 6, 7 and 8. Each of the support hubs 10 associated with the different loading modules 4 comprises a core 32 connected to a shaft 33a of the driving motor 33 associated with the hub itself. The core 32 has a cylindrical portion 32a adapted to coaxially engage the respective pancake 9 through the coupling opening 9a offered by the same, as well as a dish-shaped portion 32b offering an abutment seat to the pancake 9 so that the latter can take the exact positioning on the support hub 10.

Associated with the core 32 are at least three locking levers 34, circumferentially distributed at 120° from one another about the axis of the core itself. In greater detail the locking levers 34 are located in respective housings 35 formed in the cylindrical portion 32a of the core 32, and exhibit each one end 34a oscillatable connected to the core according to an axis parallel to the axis of said core and a second end 34b carrying a retention element 36. This retention element 36 preferably consists of a cylindrical element made of elastomeric material, and is adapted to exert a thrust action inside the coupling opening 9a of the pancake 9 so as to fix the positioning of said pancake on its support hub 10.

Each lever 34 is submitted to the action of spring means tending to urge it towards the middle of the core 32. This spring means preferably consists of compression springs 37 each acting between one of said levers and a locator wall 35a formed within the corresponding housing 35.

The support hub 10 further comprises an actuator collar 38 coaxially slidable relative to the core 32 and having at least three circumferential projections distributed at 120° from one another, each of one of the locking levers 34. In greater detail said projections are preferably comprised of balls 39 rotatably accommodated within through holes 40 radially formed in said actuator collar. The balls 39 are enclosed between an annular element 41 coaxially fitted into the core 32 and an inclined surface 42 forming said front edge of the corresponding locking lever 34. In this manner the balls 39 can be driven in axial movement along with the actuator collar 38 so as to cause, by acting on the respective inclined surfaces 42, the moving away of levers 34 from the axis of hub 10, against the action of the compression springs 37.

The actuator collar 38 is slidably engaged within a guide collar 43 fastened to the core 32 in coaxial relation therewith and exhibiting one or more longitudinal elongated holes 44 slidably engaging at least one peg 45 radially projecting from the actuator 38 so as to prevent the actuator collar from rotating relative to the core 32. Preferably the guide collar 43 is fastened to the core 32 by means of threaded elements 46 extending through curved slots 47 formed at the front of the guide collar itself. Therefore the guide collar can be secured to the core 32 at different angular positionings corresponding to different angular positionings of collar 38 and consequently of balls 39. In this way it is advantageously possible to modify the distance between the balls 39 and the first ends 34a of the locking levers 34 in order to adjust, depending upon the diameter of the coupling opening 9a in the pancakes 9, the displacement degree imparted to the levers as a result of the axial movement of the actuator collar 38.

As above said with reference to the drive shank 27 and the second guide sleeve 26 of the storage unit 14, also the actuator collar 38 and guide collar 43 are provided with circumferential grooves can be engaged, as will be clearer in the following, by drive means 73 for setting the actuator collar itself in axial motion.

As viewed from FIGS. 1, 2 and 3, apparatus 1 further comprises a manipulation unit 48 provided with a main carriage 49 slidably mounted on guide bars 50 extending horizontally on top of the cassette loading machine 2. The main carriage 49 is movable in a direction at right angles to the axes of hubs 10 upon command of a threaded rod 51 parallel to the guide bars 50 and operable in rotation by a driving motor 52 controlled by a conventional encoder 53. The encoder 53 is in communication with an electronic control box (neither shown nor described in detail as it can be accomplished following different modes known to those skilled in the art) on which the whole operating management of the cassette loading machine 2 relies.

Associated with the main carriage 49 is a discharge module 54 and a supply module 55 which are substantially identical and are respectively designed to remove an out of tape pancake 9 from the respective support hub 10 and to pick up a new pancake 9 filled with use tape 8 from the storage unit 14 and engage it on the hub. It is to be noted that the above operations can be also performed by a single module but in that case the time involved for the pancake replacement will be greater.

As more clearly shown in FIGS. 2 and 3, each discharge module 54 and supply module 55 comprises a support arm 56 extending vertically downwardly from the main carriage 49. The arm 56 is connected to the main carriage 49 by a pair of guide members 57 and is movable parallelly to the axes of the support hubs 10 through a fluid-operated drive actuator 58 fastened to the main carriage, in order to be brought from a rest condition in which it is spaced apart from the front wall 11 of the loading machine 2 to a working position in which it is located close to the front wall itself.

Connected to the lower end of each of the support arms 56 is a grasping release member 59 which, as best clarified in the following, as a result of the movement of the main carriage 49 and the respective support arm 56, can be operatively engaged with the support hub 10 and the storage unit 14 in order to pick up and lay down the new pancakes 9.

Figure 9:
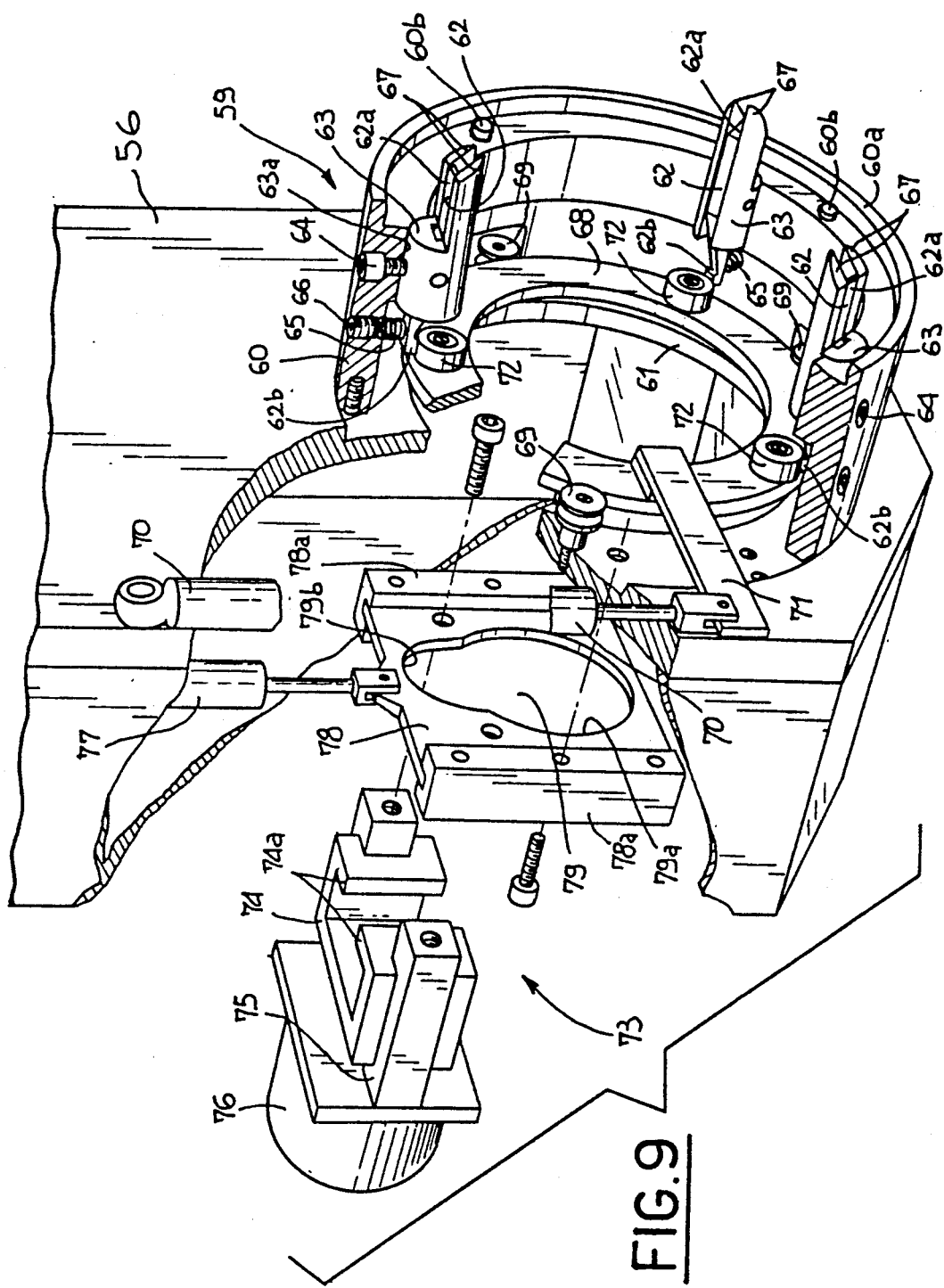
FIG. 9 is a fragmentary exploded view in perspective of one of the grasping and release members associated with the manipulating unit, the other grasping and release member being identical to the one shown.

Referring particularly to FIGS. 9 and 10, each of the grasping and release members 59 comprises a support collar 60 fastened to the support arm 56 in coaxial relation with an access opening exhibited by the support arm itself. The support collar 60 is adapted to come into coaxial engagement, as diagrammatically shown in dotted lines in FIGS. 5, 8 and 10, with the support hub 10 and the storage unit 14 when the corresponding support arm 56 is brought to its working position.

The support collar 60 has a front edge 60a facing the front wall 11 of the cassette loading machine 2. This front edge 60a is designed to offer a bearing seat for the individual pancakes 9 taken from the storage unit 14 and removed from the support hub 10, as shown in FIG. 10.

Oscillatably connected to the support collar 60 are at least three gripping levers 62, circumferentially distributed at 120° from one another relative to the axis of the collar itself. More particularly, each gripping lever 62 is oscillatably linked to the inner part of a guide block 63 extending parallelly to the axis of the support collar 60 and fixedly engaged through one or more threaded members 64, in a corresponding seat 63a formed within the collar 60 itself. In addition each gripping lever 62 has one end 62a projecting forwardly from the support collar 60 so as to be fitted, as more clearly shown in the following, into the coupling opening 9a of the pancake 9 which must be picked up from the storage station 14 or from the support hub 10 as well as a second end 62b projecting outwardly from the guide block 63 and submitted to the action of a compression spring 65 acting between the lever itself and a grub screw 66 operatively engaged through the support collar 60. Preferably, the first end 62a of each gripping lever 62 is confined between two centering projections 67 exhibited by the guide block 63 and protruding from the front edge 60a of collar 60.

Coaxially housed within the support collar 60 is an actuator ring 68 rotatably engaged by at least three guide rollers connected to the support arm 56 and distributed circumferentially around the access opening 61. The actuator ring 68 is operable in rotation according to a predetermined angle upon command of a fluid-operated cylinder 70 secured to the arm 56 and acting on a plate 71 radially projecting from said actuator ring, through a slot 71a (FIG. 2) formed in the support collar 60. The actuator ring 68 is also provided with at least three projections 71, preferably consisting of thrust rollers 72 rotatably engaged to the ring and distributed at 120° from one another. Said thrust rollers 72 are intended to act on the second ends 62b of the gripping levers 62 for simultaneously moving the latter, against the action of the return springs 65, from a gripping condition in which, as shown in dotted lines in FIG. 10, the first ends 62a of the levers 62 are radially, spaced apart from the axis of the support collar 60 to a release condition in which said first ends are moved close to the axis of the support collar, as shown in the accompanying figures.

Still in accordance with the present invention, also associated with each grasping and release member 59 is drive means 73 designed to selectively act on the drive shank 27 of the storage unit 14 and/or the actuator collar 38 of the individual support hubs 10 causing the axial movement of said shank and/or collar in order to carry out the engagement and disengagement of the pancakes 9.

Referring to FIGS. 9 and 10, the drive means 73 comprises a hooking element 74 provided with two c-faced hooking portions 74a. The hooking element 74 is slidably engaged to a guide block 75 and is movable parallelly to the axis of the support collar 60, upon command of an axial-movement actuator 76 secured to the guide block itself.

The guide block 75 is secured to a plate-like element 78 engaged on a pair of guide members 78a fastened to the inside of the arm 56. Preferably the plate-like element 78 is provided with a shaped opening 79 having an insertion portions 79a larger in width than the diametrical size of the second guide sleeve 26 belonging to the storage unit 14, as well as of the guide collar 43 belonging to the individual support hubs 10. Aligned with the insertion portion 79a parallelly to the movement of the plate-like element 76 is a fitting portion 79b smaller in width than the insertion portion 79a and adapted to operatively engage in the circumferential grooves 81, 85 formed on the second guide sleeve 26 and the guide collar 43 respectively.

A radial-movement actuator 77 secured to the support arm 56 acts on the plate-like element 78 for radially moving it relative to the axis of the support collar 60 together with the hooking element 74. More specifically, following the operation of the radial-movement actuator 77, the hooking element 74 is moved from a rest position in which it is radially spaced apart from the axis of the support collar 60 to an operating position in which it is in coaxial alignment with the axis of the support collar. At the same time the plate-like element 78 is moved from a rest position in which the insertion portion 79a of the shaped opening 79 is in coaxial alignment with the axis of the support collar 60, to an operating position in which the fitting portion 79b of said shaped opening is coaxially aligned with the axis of the collar itself.

Operation of the apparatus according to the invention described above mainly as regards structure, is as follows.

During the normal running of the cassette loading machine 2, the manipulating unit 48 is positioned in front of the storage unit 14 in order to pick up one of the pancakes 9 filled with use tape 8 by means of the supply module 55. In greater detail, for the purpose the grasping and release member 59 associated with the supply module 55 is provided to be coaxially aligned with the guide sleeves 19, 26 of the storage unit 14, due to the movement of the main carriage 49 on the guide bars 50.

Upon command of the fluid-operated actuator 70, the actuator ring 68 is rotated through an angle so that the thrust rollers 72 carried by it move the gripping levers 62 to the release position.

Subsequently, the support arm 56 belonging to the supply module 55 is brought to the operating position so that the grasping and release member 59 is coaxially engaged onto the second guide sleeve 26, bringing the front edge 60a of the support collar 60 to a short distance from one of the pancakes 9 mounted on the first guide sleeve 19. During this step the drive shank 27 and the second guide sleeve 26 are introduced into the insertion portion 79a of the shaped opening 70 exhibited by the plate-like element 78, so that the circumferential grooves 80, 81 of the shank and the sleeve are disposed in radial alignment relative to the hooking portions 74a of the hooking element 74 and the plate-like element 78. Simultaneously, the centering projections 67 of the guide blocks 63 enter corresponding cavities 82 suitably arranged on the release collar 25 and on the first guide sleeve 19, at radially inner positions relative to the circumferential edges of the coupling openings 9a of the pancakes 9, so as to make the gripping levers 62 ready for the engagement of one of the pancakes.

At this point the radial-movement actuator 77 is driven in movement and it causes the shifting of the hooking element 74 and the members connected thereto from the rest position to the operating position. Under this situation the hooking portions 74a of the hooking element 74 enter the circumferential groove 80 offered by the drive shank 27 belonging to the storage unit 14

Simultaneously also the plate-like element 78 is brought from the rest position to the operating position, so that the edges of the fitting portion 79b come into engagement with the circumferential groove 81 exhibited by the second guide sleeve 26 of the storage unit 14.

The axial-movement actuator 76 is then operated and through the hooking element 74 it is axially urges the drive shank 27 towards the inside of the second guide sleeve 26, overcoming the resistance of the return spring 28. Under this situation the reaction of the spring 28 is advantageously discharged onto the second guide sleeve 26 through the plate-like element 78, locked in the circumferential groove 81, so that undesired bending moments are not transmitted to the guide bars 50 of the main carriage 49, through the support arm 56.

By axial movement of the drive shank 27, the angular rotation of collar 25 is achieved as a result of the peg 29 sliding in the helical groove 31, so that the pawls 24 are brought into alignment with the guide elements 20. Under this situation one of the pancakes 9 being pushed by the preload spring 21, is allowed to leave the first guide collar 19 as far as it abuts the front edge 60a of the support collar 60.

As the deactivation of the axial-movement actuator 76 occurs, the drive shank 27 is again urged outwardly of the second drive collar 26 upon the action of the return spring 28. Thus the pancake 9, disengaged from the first guide sleeve 19 and the guide elements 20 mounted thereon, is driven in angular rotation along with the pawls 24.

Now the fluid-operated cylinder 70 is deactivated and the return springs 65 can therefore bring the gripping levers 62 back to their gripping position so that they will be able to hook the pancake 9 at the edges of the coupling opening 9a.

Then the radial-movement actuator 77 brings the plate-like element 78 and as a result the hooking element 74 back to the rest position, in order to enable the subsequent return of the support arm 56 to the respective rest position upon command of the actuator 58. Said situation remains unchanged as far as an out of tape pancake 9 mounted on the different loading modules 4 is detected.

Following said detection the manipulating unit 48, through the movement of the main carriage 49 along the guide bars 50, is brought in front of the loading module 4 the pancake of which needs to be replaced. During this step the grasping and release member 59 is brought into alignment with the support hub 10 carrying the pancake 9 to be replaced and, in the same manner as previously described with reference to the supply module 55, the fluid-operated cylinder 70 is activated so that the gripping levers 62 can take the release position. Then the discharge module 54 is driven and it moves close to the front wall 11 of the loading machine 2 so that the support collar 60 is coaxially engaged onto the guide collar 43 and the actuator collar 38 of the hub 10. Simultaneously, the centering projections 67 and the front ends 62 of the gripping levers 62 are fitted into respective notches 83 formed at the front of the core 32, in the same manner as previously described with reference to the storage unit 14. The exact positioning of notches 83 so as to bring about the easy engagement of the centering projections 67 is ensured by control means such as an encoder or the like, associated with each of the motors 33 controlling the rotation of the support hubs 10.

Yet in the same manner as previously described, when the grasping and release member 59 nears the hub 10, the actuator collar 38 and guide collar 43 enter the insertion portion 79a of the shape opening 79 formed on the plate-like element 76.

At this point the radial-movement actuator 77 is activated so as to cause the hooking element 74 to engage with the circumferential groove 84 formed in the actuator collar 38, while the edges of the fitting portion 79b of the opening 79 come into engagement with the circumferential groove 85 exhibited by the guide collar 43 (FIG. 10). Then the axial-movement actuator 76 is set in motion and it causes the axial displacement of the actuator collar 38 away from the hub 10. In this situation the balls 39 previously located between the annular element 41 and the inner cylindrical surface 42a of the locking levers 34, tend to move away from the inclined surface 42 of the respective locking levers 34, which will cause the levers themselves to move close to the axis of the hub 10 and, as a result, the disengagement of the pancake 9 from the retention member 36.

As the fluid-operated cylinder 70 is deactivated, the gripping levers 62 are brought to a gripping position so that the pancake 9 is held against the support collar 60.

Then following the displacement of the support arm 56 apart from the front wall 11 of the loading machine 2, the pancake 9 is removed from the hub 10 after the hooking element 74 and plate-like element 76 have been brought back to their rest position upon the action of the radial-movement actuator 77.

By a further movement of the main carriage 49, the hub 10 is brought into alignment with the grasping and release member 59 of the supply module 55 the gripping levers 62 of which engage a pancake 9 filled with use tape 8 previously picked up from the storage unit 14. Then the supply arm 56 of the supply module 55 is moved close to the front wall 11 so that it operatively engages the grasping and release member 59 onto the support hub 10, in the same manner as previously said. The engagement of the hooking element 74 into the circumferential groove 84 of the actuator collar 38 is carried out through the radial actuator 77, and the fitting portion 79b of the shaped groove 79 also engages with the circumferential groove 85 of the guide collar 43.

Then the axial-movement actuator 76 is operated and it will urge the actuator collar 38 into the guide collar 43, causing the locking levers 34 to move apart from the axis of hub 10, upon the action of balls 39 As a result the pancake 9 will be engaged by the retention elements 36. Then, through the action of the fluid-operated actuator 70, the gripping levers 62 will be released from the coupling opening 9a of the pancake Finally the radial-movement actuator 77 will bring the hooking element 74 and plate-like element 78 to the rest position, to enable the support arm 56 to move apart from the front wall 11.

In this manner, the new pancake 9 filled with use tape 8 will be correctly engaged on the support hub 10, whereas the empty discharged pancake 9 is still held by the grasping and release member 59 belonging to the discharge module 54. This empty pancake will be disengaged from the grasping and release member 59 and will drop down to a receptor vessel 86 when the manipulating unit 48 has come back to the storage unit 14 for the purpose of picking up a new pancake 9 filled with use tape.

The disengagement operation is advantageously carried out by three thrust pins 60b elastically housed within the support collar 60.

In the embodiment shown, the manipulating unit 48 is also provided to be associated with a setup module, generally referenced by 87, enabling the engagement in a predetermined path of the end of the use tape 8 wound onto the new pancake 9 carried by hub 10, between the different members of the corresponding loading module 4, before the manipulating unit itself has come back to the position facing the storage station 14. More particularly, this setup module, is described in detail in a Patent Applications filed on the same date in the name of the same, Applicant, including U.S. patent application Ser. No. 07/585,395 now U.S. Pat. No. 5,125,589 entitled Tape Threading Apparatus which is incorporated herein by reference, first causes the engagement of the use tape 8 into the control unit 88 adapted to make the motor 33 run in timed relationship with the motor or motors carrying the winding of the use tape 8 into the cassette 3 being loaded. Then the use tape 8 is passed over a counting wheel 89 designed to detect the amount of use tape which is gradually wound onto each cassette hub and it is subsequently laid on one or more guide blocks 90 facing the loading station 5.

The present invention attains the intended purposes.

By virtue of the apparatus in reference it is in fact possible to carry out a completely automatic replacement of the pancakes mounted on one or more support hubs in a cassette loading machine, without any manual intervention by the operator being needed.

It will be understood that while the apparatus has been described with reference to a loading machine provided with several loading modules, it can also be associated with loading machines having a single loading station.

Although the present invention has been described with reference to a specific embodiment, neither the exact described operation, nor the specific structure mentioned should be construed as limiting since the disclosed embodiment is merely illustrative of the invention. One of skill in the art may alter the described embodiment without departing from the spirit or scope of the invention.

What is claimed is:

1. An automated apparatus for supplying magnetic tape reels for cassette loading machines, comprising:
    at least one rotatable support hub capable of engaging a magnetic tape reel comprising:
        a core rotatable by a motor; and
        at least three locking levers circumferentially distributed about the core axis capable of exerting a force to fix the position of a reel on said support hub;
    a storage unit capable of storing, on a central support shaft having a free end, a plurality of reels of magnetic tape for mounting on said support hub, wherein said storage unit comprises means for biasing said plurality of reels toward said free end of said central support shaft;
    a main carriage slidably movable in relation to a loading machine and said storage unit, wherein said main carriage has at least on support arm extending therefrom, and wherein said support arm is movable relative to said support hub from a rest position in which it is spaced apart from a front wall of the loading machine to a working position in which it is located close to said front wall; and
    at least one grasping and release member connected to said support arm capable of engaging said support hub and said storage unit in order to remove an empty tape reel from said support hub, pick up a new tape reel from said storage unit and fit said new tape reel on said support hub in place of the empty reel.

2. The apparatus as claimed in claim 1, wherein said storage unit comprises:
    a removable support framework;
    a guide sleeve fixedly supported in cantilevered fashion on said removable support framework and engaging said filled reels; and
    at least one guide element extending along said guide sleeve capable of fitting into grip recesses exhibited by central coupling openings of said filled reels, wherein said guide element prevents said filled reels from rotating.

3. The apparatus as claimed in claim 2, wherein the support framework of the storage unit is removably mounted along slide rails fixedly carried by a cassette loading machine.

4. The apparatus as claimed in claim 1, wherein said grasping and release member comprises:
    a support collar secured to the support arm capable of engaging said support hub and said storage unit when the support arm is brought to the working position;
    a plurality of gripping levers circumferentially distributed in the support collar having respective first ends projecting from the support collar to engage a coupling opening of a filled reel; and
    an actuator ring rotatably mounted within the support collar, capable of moving the gripping levers, from a gripping condition in which the first ends of said levers are radially moved away from the support collar axis to a release condition in which said first ends are moved toward the support collar axis to disengaged said reel.

5. The apparatus as claimed in claim 4, wherein each of the gripping levers of the grasping and release member is mounted in a guide block having centering projections protruding from the front of the support collar.

6. The apparatus as claimed in claim 4, wherein the first ends of said gripping levers engage corresponding cavities formed at the front of the release collar, the first drive sleeve of the storage unit, and said core when said gripping levers are in said released position.

7. The apparatus as claimed in claim 4, wherein said actuator ring is rotatably supported by a plurality of guide rollers rotatably mounted on the support arm and circumferentially distributed around the support collar axis.

8. The apparatus as claimed in claim 4, wherein the radial projections on the actuator ring consist of thrust rollers rotatably engaged to the actuator ring and capable of engaging the second end of one of the gripping levers.

9. The apparatus as claimed in claim 1, wherein said grasping and release member further comprises drive means capable of engaging a drive shank connected to the storage unit to axially move said drive shank.

10. The apparatus as claimed in claim 9, wherein said drive means comprises:
    a hooking member having two faced hooking portions;
    a guide block slidably engaging the hooking element;
    an axial-movement actuator mounted on the guide block and acting on the hooking element;
    a plate-like element fixedly carrying the guide block and being slidably engaged with the support arm; and
    a radial-movement actuator acting on the plate-like element to bring the hooking element from a rest position in which it is moved apart from the support collar axis to an operating position in which it is substantially in alignment with the axis of said support collar so that it operatively engages the drive shank of the storage unit.

11. The apparatus as claimed in claim 10, wherein said plate-like element has a shaped opening provided with an insertion portion and a fitting portion, said plate-like element being movable from a rest position, to an operating position in which the fitting portion is in alignment with the axis of the support collar.

12. The apparatus as claimed in claim 11, wherein the hooking element and plate-like element in the operating position engage circumferential grooves formed in the drive shank and the actuator collar respectively.

13. The apparatus as claimed in claim 1, wherein the main carriage has first and second support arms extending therefrom having, respectively, first and second grasping and release members connected thereto, wherein said first grasping and release member is capable of picking up a new reel from said storage unit and putting in onto said support hub and wherein said second grasping and release member is capable of removing an empty tape reel from said support hub.

14. The apparatus as claimed in claim 1, wherein said support arm is movable on guide members fixedly carried by the main carriage by a fluid-operated control actuator fastened to said main carriage.

15. The apparatus as claimed in claim 1, further including spring means comprising a plurality of compression springs each operating between one of said locking levers and a locator wall.

* * * * *